(12) United States Patent
Kim et al.

(10) Patent No.: US 11,953,930 B2
(45) Date of Patent: Apr. 9, 2024

(54) ELECTRONIC PEDAL APPARATUS

(71) Applicants: Hyundai Motor Company, Seoul (KR); Kia Corporation, Seoul (KR); Dong Hee Industrial Co., Ltd., Ulsan (KR)

(72) Inventors: Eun Sik Kim, Gwangmyeong-si (KR); Wi Sang Park, Hwaseong-si (KR); Jae Hyun Cho, Suwon-si (KR); Jung Min Lee, Busan (KR); Seong Ju Jo, Seoul (KR)

(73) Assignees: HYUNDAI MOTOR COMPANY, Seoul (KR); KIA CORPORATION, Seoul (KR); DONG HEE INDUSTRIAL CO., LTD., Ulsan (KR)

( * ) Notice: Subject to any disclaimer, the term of this patent is extended or adjusted under 35 U.S.C. 154(b) by 0 days.

(21) Appl. No.: 17/969,815

(22) Filed: Oct. 20, 2022

(65) Prior Publication Data

US 2023/0350447 A1 Nov. 2, 2023

(30) Foreign Application Priority Data

May 2, 2022 (KR) .................. 10-2022-0054306

(51) Int. Cl.
| | |
|---|---|
| *G05G 1/36* | (2008.04) |
| *B60K 26/02* | (2006.01) |
| *B60T 7/04* | (2006.01) |
| *B60T 7/06* | (2006.01) |
| *G05G 1/38* | (2008.04) |
| *G05G 1/42* | (2008.04) |
| *G05G 5/05* | (2006.01) |

(Continued)

(52) U.S. Cl.
CPC .............. *G05G 1/36* (2013.01); *B60K 26/02* (2013.01); *B60T 7/042* (2013.01); *B60T 7/06* (2013.01); *G05G 1/38* (2013.01); *G05G 1/42* (2013.01); *G05G 5/05* (2013.01); *G05G 13/00* (2013.01); *G05G 25/04* (2013.01); *G05G 2505/00* (2013.01)

(58) Field of Classification Search
CPC .. G05G 1/36; G05G 1/38; G05G 1/42; G05G 1/305; B60K 2026/026; B60K 2026/025; B60K 2026/024
See application file for complete search history.

(56) References Cited

U.S. PATENT DOCUMENTS

| | | | |
|---|---|---|---|
| 9,381,809 B2 | 7/2016 | Gauthier | |
| 2019/0220052 A1* | 7/2019 | Kihara | ..................... G05G 5/03 |
| 2020/0183443 A1 | 6/2020 | Kim | |

FOREIGN PATENT DOCUMENTS

| | | |
|---|---|---|
| EP | 3118046 B1 | 2/2018 |
| IN | 204567311 U | 8/2015 |

(Continued)

*Primary Examiner* — Daniel D Yabut
(74) *Attorney, Agent, or Firm* — SLATER MATSIL, LLP

(57) ABSTRACT

An embodiment electronic pedal apparatus includes a pedal housing and an accelerator pedal assembly and a brake pedal assembly coupled to the pedal housing and configured to move along different movement trajectories when the accelerator pedal assembly and the brake pedal assembly are operated. In an embodiment, the accelerator pedal assembly is compressed and moved upward when the accelerator pedal assembly is operated, and the brake pedal assembly is compressed and moved downward when the brake pedal assembly is operated.

18 Claims, 10 Drawing Sheets

(51) Int. Cl.
*G05G 13/00* (2006.01)
*G05G 25/04* (2006.01)

(56) References Cited

FOREIGN PATENT DOCUMENTS

| | | | |
|---|---|---|---|
| JP | 2000355272 | A | 12/2000 |
| JP | 2012066644 | A | 4/2012 |
| JP | 2020194405 | A | 12/2020 |
| KR | 19970015306 | A | 4/1997 |
| KR | 20200070946 | A | 6/2020 |

* cited by examiner

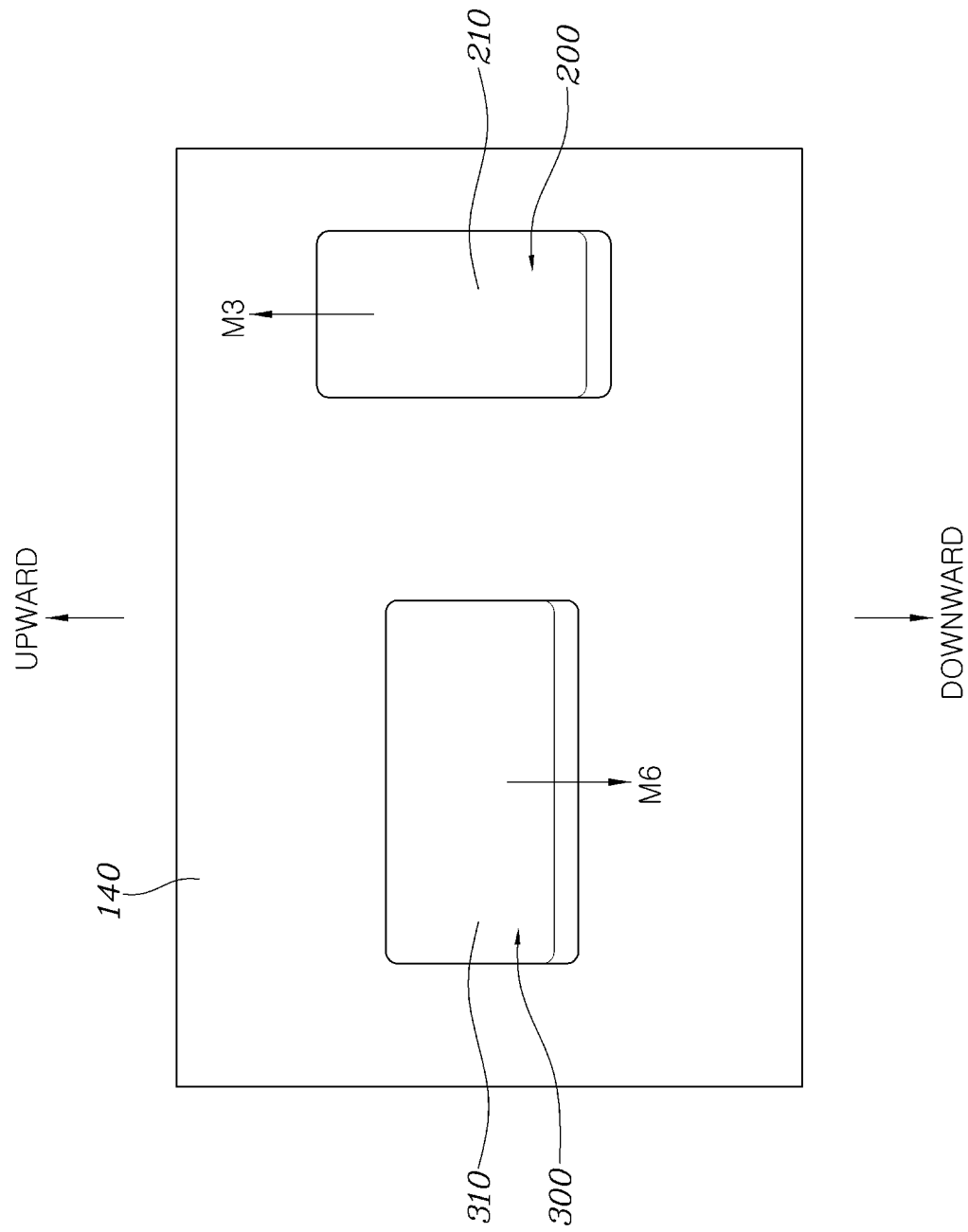

ELECTRONIC PEDAL APPARATUS

CROSS-REFERENCE TO RELATED APPLICATIONS

This application claims the benefit of Korean Patent Application No. 10-2022-0054306, filed on May 2, 2022, which application is hereby incorporated herein by reference.

TECHNICAL FIELD

The present invention relates to a technology related to an electronic pedal apparatus.

BACKGROUND

An autonomous vehicle refers to a smart vehicle to which an autonomous driving technology is applied so that the vehicle autonomously arrives at a destination even though a driver does not directly manipulate a steering wheel, an accelerator pedal, and a brake pedal.

In a case in which an autonomous driving situation is universally implemented, the driver may select an autonomous driving mode in which the driver does not directly drive the vehicle and the vehicle autonomously travels to the destination.

It is necessary to enable the driver to rest comfortably with his feet stretched in the autonomous driving mode. If pedals (an accelerator pedal and a brake pedal) positioned in a lower space of a driver seat are kept exposed to the interior of the vehicle, the pedals disturb the driver's relaxation. In particular, if a pad of a pedal device is erroneously operated regardless of the driver's intention, there is a risk that an accident occurs.

Therefore, a foldable pedal device for an autonomous vehicle is being developed, in which a pedal pad is exposed to protrude toward the driver so that the driver may operate the pad in the manual driving mode in which the driver directly drives the vehicle, and the pedal pad is hidden so as not to protrude toward the driver in the autonomous driving mode so that the pad cannot be operated by the driver, thereby ensuring the driver's comfortable relaxation and implementing safety by preventing an erroneous operation.

However, the foldable pedal device has a drawback in that it is necessary to provide a space for hiding the pedal device in a hidden state, and an operation mechanism is also complicated.

To solve the above-mentioned problems, a technology related to a pressure-operating pedal apparatus is being developed.

The pressure-operating pedal apparatus requires a very small operating displacement of a pedal and has a simple operation mechanism. Further, the pressure-operating pedal apparatus does not require a mechanical configuration related to a foldable function, which provides an advantageous effect of innovatively improving an indoor space of an autonomous driving vehicle.

However, in the case of the pressure-operating pedal apparatus, because the operating displacement of the pedal is very small, it is difficult for a driver to easily recognize a degree to which the driver operates the pedal. Further, since the pressure-operating pedal apparatus is operated only by force applied by the driver, the driver's fatigue increases when the driver operates the pressure-operating pedal apparatus over a long period of time.

The foregoing explained as the background is intended merely to aid in the understanding of the background of embodiments of the present invention, and is not intended to mean that the present invention falls within the purview of the related art that is already known to those skilled in the art.

SUMMARY

The present invention relates to a technology related to an electronic pedal apparatus. Particular embodiments relate to a technology related to an electronic pedal apparatus that can be used for an accelerator pedal and a brake pedal for a vehicle.

Embodiments of the present invention can solve problems in the art and provide an electronic pedal apparatus that can be used for an accelerator pedal and a brake pedal for a vehicle. Embodiments of the present invention provide an electronic pedal apparatus that can be operated by a driver with a small effort and operate by fine displacement when the driver operates the electronic pedal apparatus, such that the driver may easily recognize an operating situation of the pedal. Further, embodiments of the present invention provide a mechanical mechanism that may assist the driver's operating force, thereby reducing the driver's fatigue.

Embodiments of the present invention provide an accelerator pedal apparatus and a brake pedal apparatus that move along different movement trajectories when a driver operates the accelerator pedal apparatus and the brake pedal apparatus, which makes it possible to improve recognition performance related to an operation of a pedal and prevent an erroneous operation.

An embodiment of the present invention provides an electronic pedal apparatus including a pedal housing and an accelerator pedal assembly and a brake pedal assembly coupled to the pedal housing and configured to move along different movement trajectories when a driver operates the accelerator pedal assembly and the brake pedal assembly.

The accelerator pedal assembly may be compressed and moved upward when the driver operates the accelerator pedal assembly, and the brake pedal assembly may be compressed and moved downward when the driver operates the brake pedal assembly.

The pedal housing may include a center housing having a space divided into left and right spaces by a partition wall, left and right housings coupled to left and right sides of the center housing, and a cover configured to simultaneously cover the center housing, the left housing, and the right housing. The accelerator pedal assembly may penetrate the cover and be installed in spaces of the center housing and the right housing, and the brake pedal assembly may penetrate the cover and be installed in spaces of the center housing and the left housing.

First elliptical holes and first circular holes may be provided in the center housing and the right housing, the accelerator pedal assembly may be assembled to the first elliptical holes and the first circular holes, and the first elliptical hole may be positioned above the first circular hole.

The accelerator pedal assembly may include a first pedal pad protruding to the outside of the cover and configured to be operated by the driver, a first front rod having one end rotatably coupled to the first pedal pad and the other end assembled to the first elliptical hole so as to move along the first elliptical hole when the first pedal pad operates, and a first rear rod having one end rotatably coupled to the first pedal pad and the other end rotatably assembled to the first circular hole.

The accelerator pedal assembly may further include a first return spring configured to connect the first front rod and the first rear rod and to restore the accelerator pedal assembly when the driver's operating force is released from the first pedal pad.

The accelerator pedal assembly may further include a first rubber damper coupled to the first pedal pad and installed to be in contact with the cover, the first rubber damper may prevent foreign substances from entering the pedal housing, and the first rubber damper, together with the first return spring, may provide a restoring force to the accelerator pedal assembly when the driver's operating force is released from the first pedal pad.

The electronic pedal apparatus may further include an acceleration sensor provided in the accelerator pedal assembly and the pedal housing and configured to generate a signal related to vehicle acceleration when the accelerator pedal assembly operates.

The acceleration sensor may include a first front magnet coupled to a lower end of the first front rod and positioned in the first elliptical hole, a first rear magnet coupled to a lower end of the first rear rod and positioned in the first circular hole, a first main printed circuit board (PCB) coupled to the pedal housing so as to face the first front magnet, the first main PCB being configured to detect a change in magnetic flux of the first front magnet and to generate a signal related to an acceleration function of a vehicle when the first pedal pad operates, and a first sub-PCB coupled to the pedal housing so as to face the first rear magnet, the first sub-PCB being configured to detect a change in magnetic flux of the first rear magnet and to generate a signal related to the acceleration function of the vehicle when the first pedal pad operates.

When the accelerator pedal assembly operates, a signal generated by the first main PCB may be a main signal, and a signal of the first sub-PCB may be a redundancy signal.

Second circular holes and second elliptical holes may be provided in the center housing and the left housing, the brake pedal assembly may be assembled to the second circular holes and the second elliptical holes, and the second circular hole may be positioned above the second elliptical hole.

The brake pedal assembly may include a second pedal pad protruding to the outside of the cover and configured to be operated by the driver, a second front rod having one end rotatably coupled to the second pedal pad and the other end rotatably assembled to the second circular hole, and a second rear rod having one end rotatably coupled to the second pedal pad and the other end assembled to the second elliptical hole so as to move along the second elliptical hole when the second pedal pad operates.

The brake pedal assembly may further include a second return spring configured to connect the second front rod and the second rear rod and to restore the brake pedal assembly when the driver's operating force is released from the second pedal pad.

The brake pedal assembly may further include a second rubber damper coupled to the second pedal pad and installed to be in contact with the cover, the second rubber damper may prevent foreign substances from entering the pedal housing, and the second rubber damper, together with the second return spring, may provide a restoring force to the brake pedal assembly when the driver's operating force is released from the second pedal pad.

The electronic pedal apparatus may further include a brake sensor provided in the brake pedal assembly and the pedal housing and configured to generate a signal related to vehicle braking when the brake pedal assembly operates.

The brake sensor may include a second front magnet coupled to a lower end of the second front rod and positioned in the second circular hole, a second rear magnet coupled to a lower end of the second rear rod and positioned in the second elliptical hole, a second main PCB coupled to the pedal housing so as to face the second rear magnet, the second main PCB being configured to detect a change in magnetic flux of the second rear magnet and to generate a signal related to a braking function of a vehicle when the second pedal pad operates, and a second sub-PCB coupled to the pedal housing so as to face the second front magnet, the second sub-PCB being configured to detect a change in magnetic flux of the second front magnet and to generate a signal related to the braking function of the vehicle when the second pedal pad operates.

When the brake pedal assembly operates, a signal generated by the second main PCB may be a main signal, and a signal of the second sub-PCB may be a redundancy signal.

The accelerator pedal assembly and the brake pedal assembly may be installed in the pedal housing and spaced apart from each other in a leftward/rightward direction, and a first pedal pad of the accelerator pedal assembly, which is operated by the driver, and a second pedal pad of the brake pedal assembly, which is operated by the driver, may be installed in the pedal housing so as to extend in a vertical direction and a horizontal direction, respectively.

The electronic pedal apparatus according to embodiments of the present invention may be operated by the driver with a small effort. Further, the electronic pedal apparatus operates by fine displacement when the driver operates the electronic pedal apparatus, such that the driver may easily recognize an operating situation of the pedal. Further, the mechanical mechanism using the return spring and the rubber damper may assist the driver's operating force, thereby reducing the driver's fatigue while the driver operates the pedal.

In addition, according to embodiments of the present invention, the accelerator pedal apparatus and the brake pedal apparatus move along the different movement trajectories when the driver operates the accelerator pedal apparatus and the brake pedal apparatus. Further, the accelerator pedal apparatus and the brake pedal apparatus perform the dual motion. Therefore, it is possible to improve the recognition performance related to the operation of the pedal and prevent the erroneous operation.

BRIEF DESCRIPTION OF THE DRAWINGS

FIG. 10 is a view illustrating a state after the accelerator pedal assembly and the brake pedal assembly according to embodiments of the present invention are operated.

DETAILED DESCRIPTION OF ILLUSTRATIVE EMBODIMENTS

Figure 1:
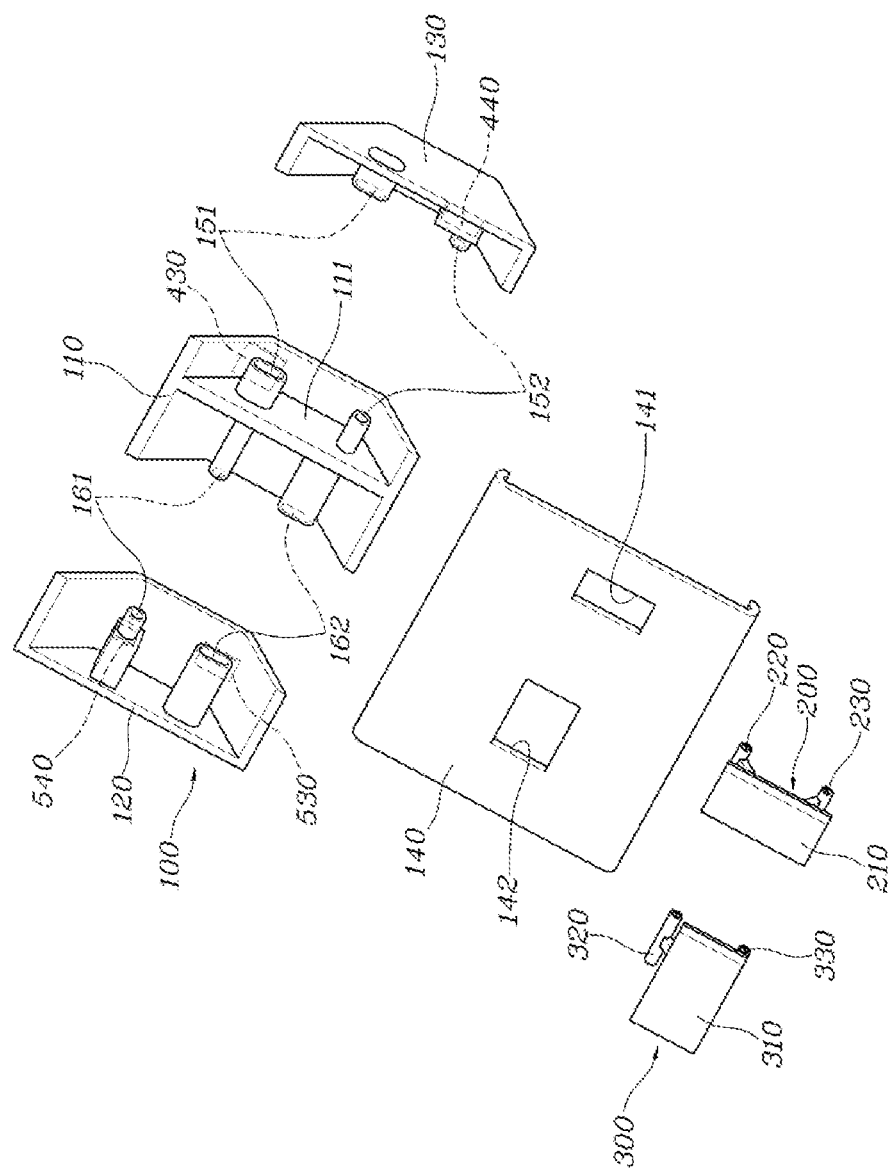
FIG. 1 is an exploded view of an electronic pedal apparatus according to embodiments of the present invention.
Figure 2:
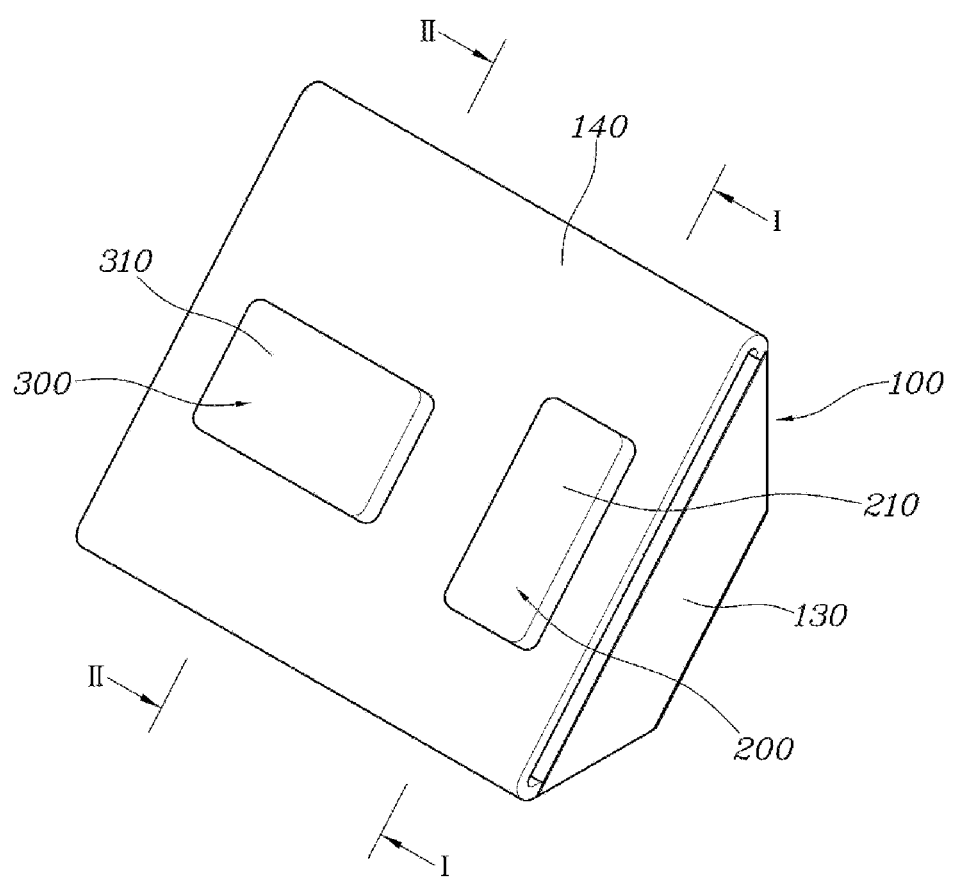
FIG. 2 is a view illustrating a coupled state of the electronic pedal apparatus in FIG. 1.
Figure 3:
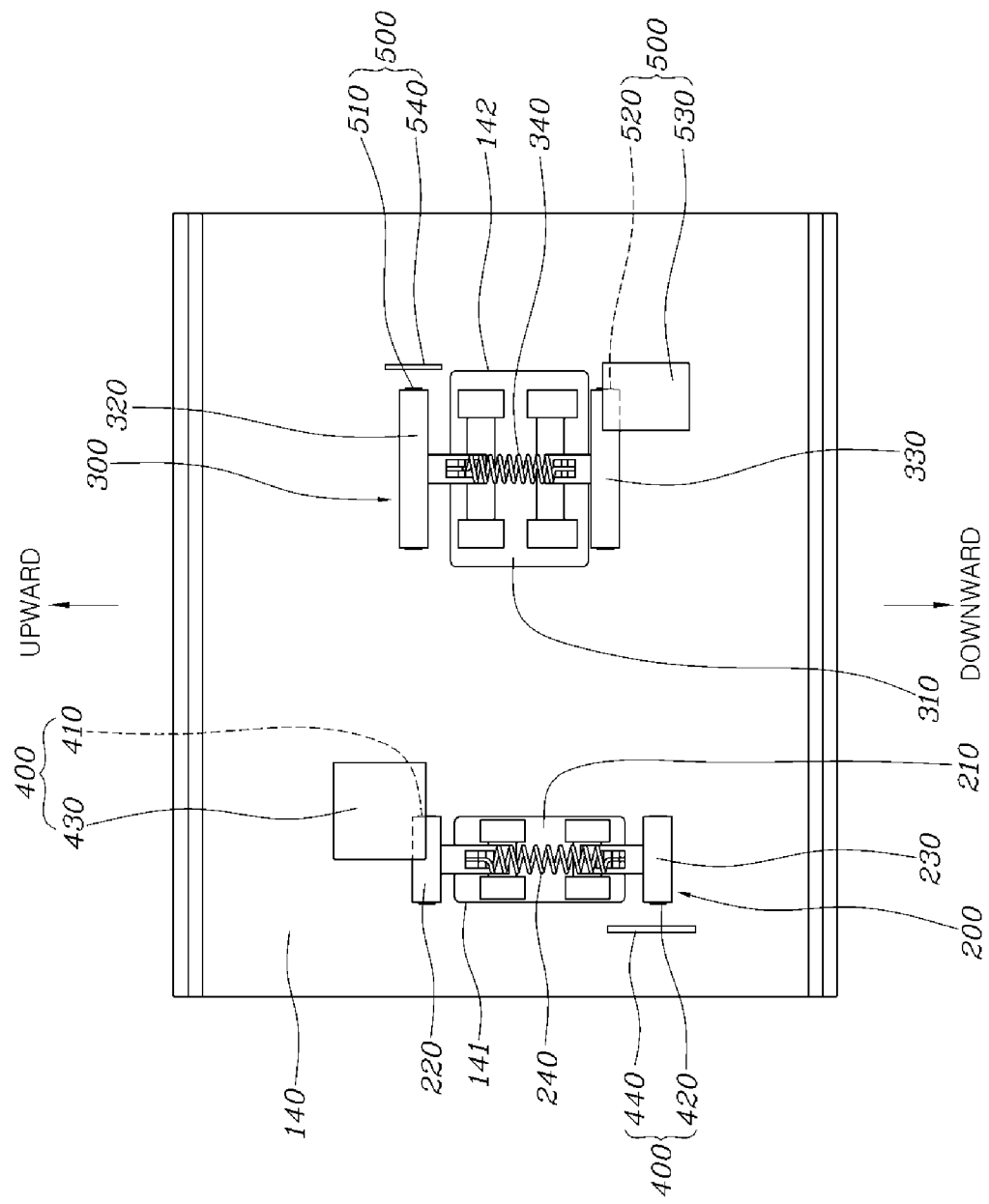
FIG. 3 is a view illustrating a state in which a pedal housing in FIG. 2 is removed when viewed from below.
Figure 4:
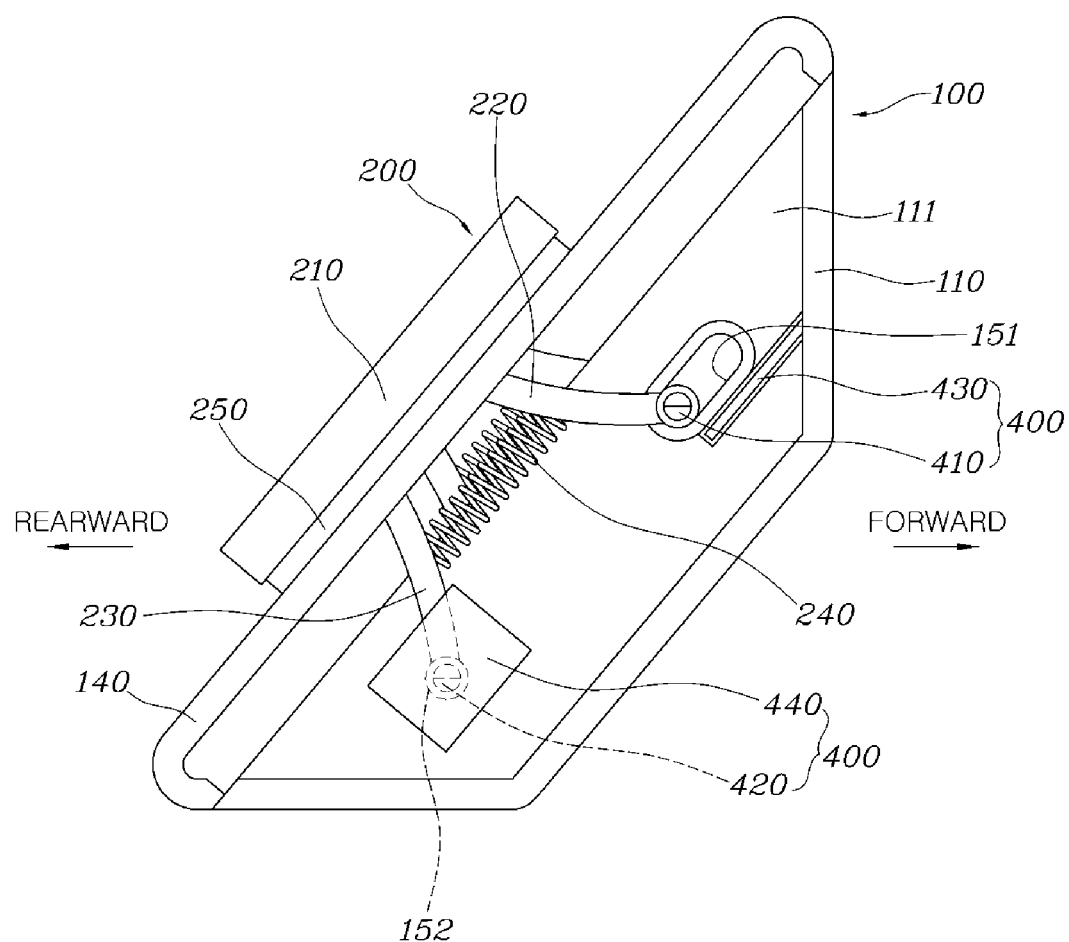
FIG. 4 is a cross-sectional view taken along line I-I in FIG. 2 and illustrating a state in which a driver does not operate an accelerator pedal assembly.
Figure 5:
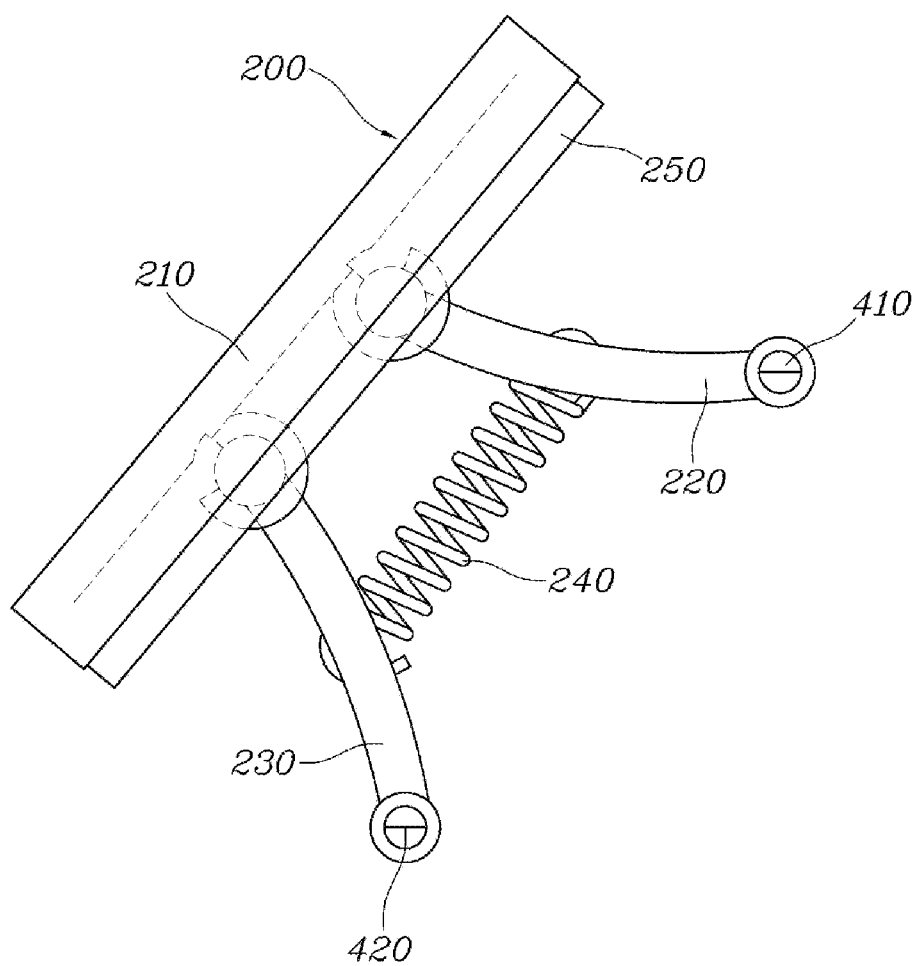
FIG. 5 is a view illustrating the accelerator pedal assembly in FIG. 4.

Specific structural or functional descriptions of embodiments of the present invention disclosed in this specification or application are exemplified only for the purpose of explaining the embodiments according to the present invention, the embodiments according to the present invention may be carried out in various forms, and it should not be interpreted that the present invention is limited to the embodiments described in this specification or application.

Because the embodiments according to the present invention may be variously changed and may have various forms, specific embodiments will be illustrated in the drawings and described in detail in the present specification or application. However, the descriptions of the specific embodiments are not intended to limit embodiments according to the concept of the present invention to the specific embodiments, but it should be understood that the present invention covers all modifications, equivalents and alternatives falling within the spirit and technical scope of the present invention.

The terms such as "first" and/or "second" may be used to describe various constituent elements, but these constituent elements should not be limited by these terms. These terms are used only for the purpose of distinguishing one constituent element from other constituent elements. For example, without departing from the scope according to the concept of the present invention, the first constituent element may be referred to as the second constituent element, and similarly, the second constituent element may also be referred to as the first constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements. Other expressions, that is, "between" and "just between" or "adjacent to" and "directly adjacent to", for explaining a relationship between constituent elements, should be interpreted in a similar manner.

The terms used in the present specification are used only for the purpose of describing particular embodiments and are not intended to limit the present invention. Singular expressions include plural expressions unless clearly described as different meanings in the context. In the present specification, it should be understood the terms "comprises," "comprising," "includes," "including," "containing," "has," "having" or other variations thereof are inclusive and therefore specify the presence of stated features, numbers, steps, operations, elements, components, or combinations thereof, but do not preclude the presence or addition of one or more other features, numbers, steps, operations, elements, components, or combinations thereof.

Unless otherwise defined, all terms used herein, including technical or scientific terms, have the same meaning as commonly understood by those skilled in the art to which the present invention pertains. The terms such as those defined in commonly used dictionaries should be interpreted as having meanings consistent with meanings in the context of related technologies and should not be interpreted as ideal or excessively formal meanings unless explicitly defined in the present specification.

A control unit (controller) according to an exemplary embodiment of the present invention may be implemented by a non-volatile memory (not illustrated) configured to store an algorithm for controlling operations of various constituent elements in a vehicle or store data related to software commands for executing the algorithm, and by a processor (not illustrated) configured to perform the following operations by using the data stored in the corresponding memory. In this case, the memory and the processor may be implemented as separate chips. Alternatively, the memory and the processor may be implemented as a single chip in which the memory and the processor are integrated. The processor may be configured in the form of one or more processors.

Hereinafter, an electronic pedal apparatus according to exemplary embodiments of the present invention will be described with reference to the accompanying drawings.

As illustrated in FIGS. 1 to 10, the electronic pedal apparatus according to embodiments of the present invention includes a pedal housing 100 and an accelerator pedal assembly 200 and a brake pedal assembly 300 coupled to the pedal housing 100 and configured to move along different movement trajectories when being operated by a driver.

The pedal housing 100 is fixedly installed in a lower space of a driver seat and has a box shape having a vacant space therein.

The accelerator pedal assembly 200 and the brake pedal assembly 300 are assemblies having the same constituent components.

Figure 6:
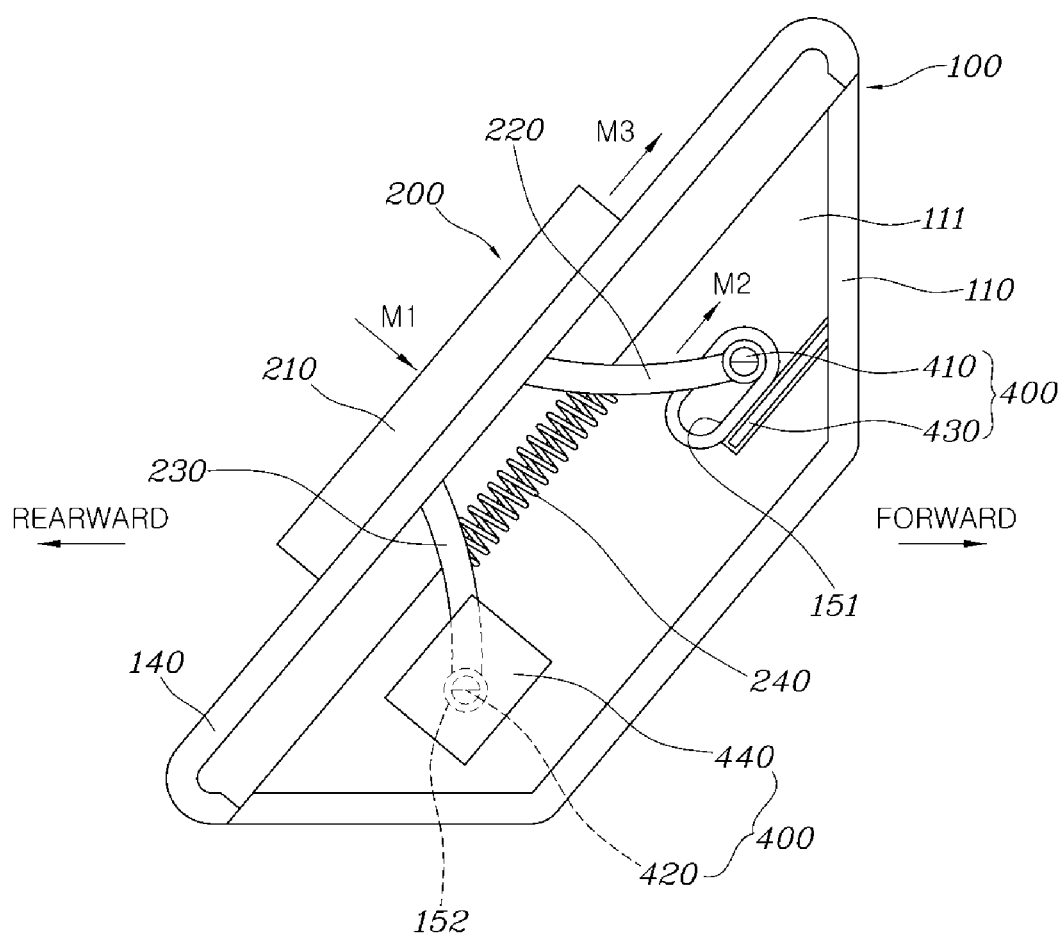
FIG. 6 is a view illustrating a state in which the driver operates the accelerator pedal assembly in FIG. 4.
Figure 7:
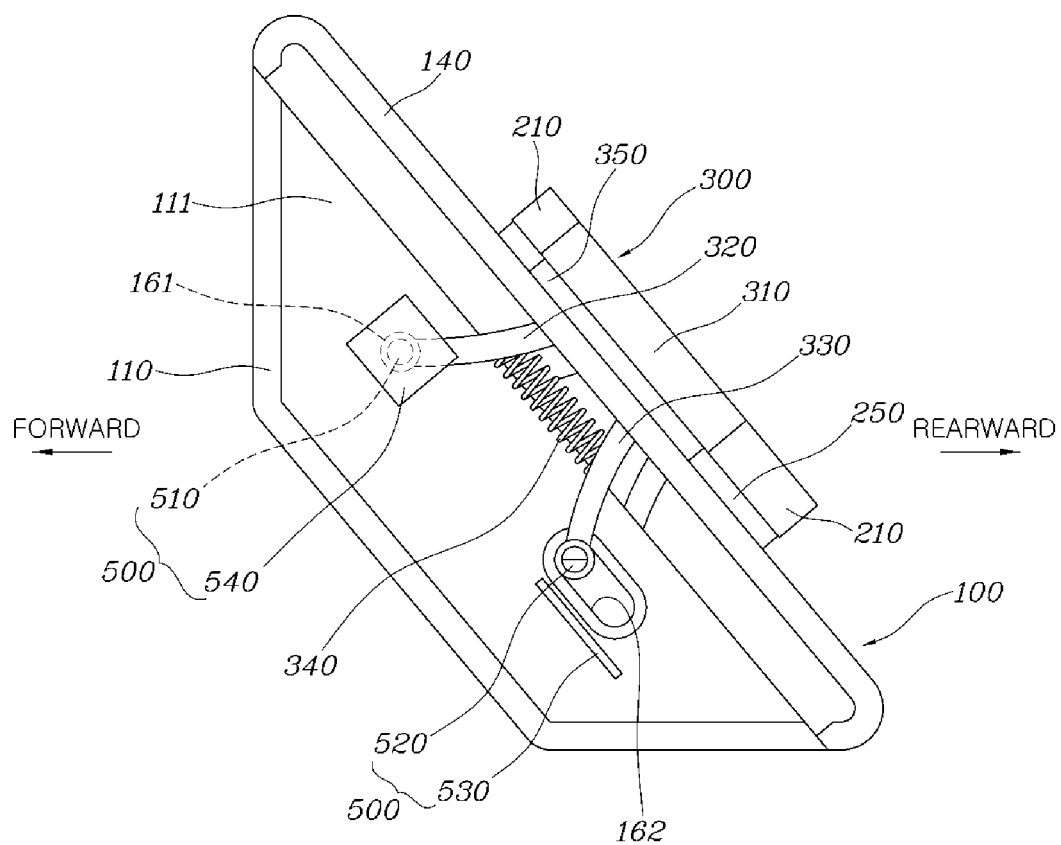
FIG. 7 is a cross-sectional view taken along line II-II in FIG. 2 and illustrating a state in which the driver does not operate a brake pedal assembly.
Figure 8:
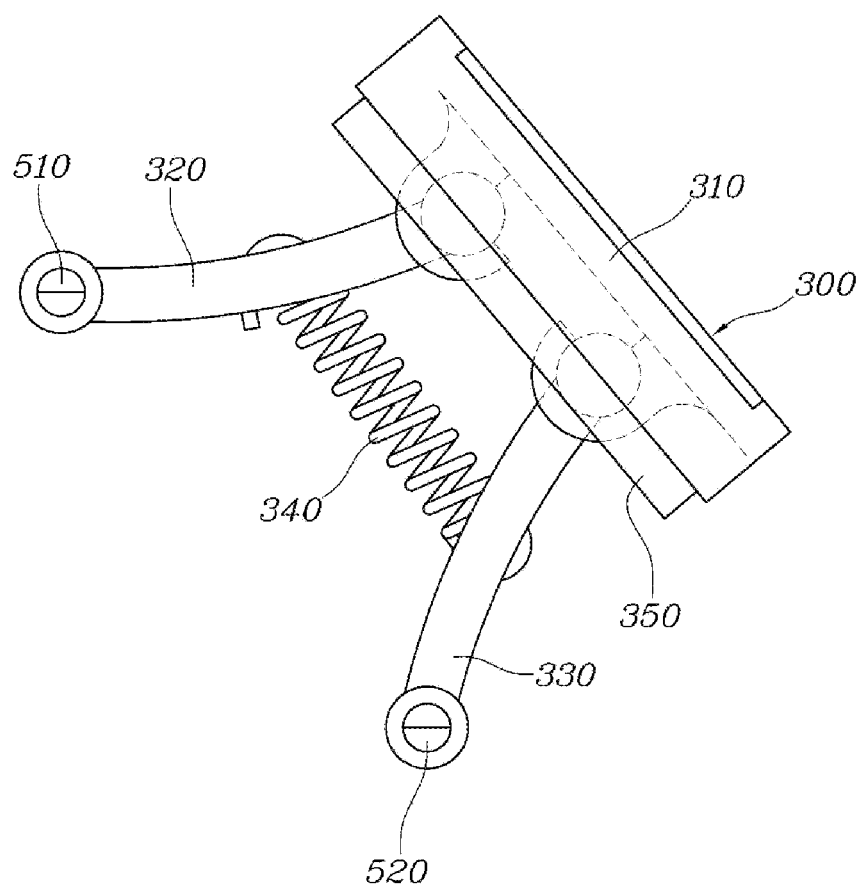
FIG. 8 is a view illustrating the brake pedal assembly in FIG. 7.

When the driver operates the accelerator pedal assembly 200, the accelerator pedal assembly 200 is compressed (see arrow M1 in FIG. 6) and moved upward (see arrow M3 in FIG. 6). When the driver operates the brake pedal assembly 300, the brake pedal assembly 300 is compressed (see arrow M4 in FIG. 9) and moved downward (see arrow M6 in FIG. 6).

Therefore, according to an embodiment of the present invention, when the driver operates the accelerator pedal assembly 200 and the brake pedal assembly 300, the accelerator pedal assembly 200 and the brake pedal assembly 300 perform different motions. Therefore, it is possible to improve the recognition performance related to the pedal operation. In particular, it is possible to prevent the erroneous operation and improve the safety related to the pedal operation.

The pedal housing 100 includes a center housing 110 having left and right spaces separated by a partition wall 111, left and right housings 120 and 130 coupled to left and right sides of the center housing 110, and a cover 140 configured to simultaneously cover the center housing 110, the left housing 120, and the right housing 130.

The partition wall 111 is provided at a middle portion of the center housing 110 and divides the center housing 110 into the left and right spaces. The left and right spaces of the center housing 110 are separated by the partition wall 111.

The left housing 120 is coupled to the left side of the center housing 110, such that a left space having a predetermined size is defined between the left housing 120 and the partition wall 111.

The right housing 130 is coupled to the right side of the center housing 110, such that a right space having a predetermined size is defined between the right housing 130 and the partition wall 111.

When the center housing 110, the left housing 120, and the right housing 130 are combined, only a portion of the pedal housing 100, which is directed rearward, is opened. The cover 140 is coupled to and covers the opened rear portion of the pedal housing 100.

The accelerator pedal assembly 200 penetrates the cover 140 and is inserted and installed in the spaces of the center housing no and the right housing 130. The brake pedal assembly 300 penetrates the cover 140 and is inserted and installed in the spaces of the center housing no and the left housing 120.

The cover 140 has cover holes 141 and 142 spaced apart from each other in the leftward/rightward direction, and the accelerator pedal assembly 200 and the brake pedal assembly 300 penetrate the cover holes 141 and 142.

The partition wall 111 divides the internal space of the pedal housing 100 into the right space in which the accelerator pedal assembly 200 is installed and the left space in which the brake pedal assembly 300 is installed. Therefore, it is possible to prevent the interference between the accelerator pedal assembly 200 and the brake pedal assembly 300 when the accelerator pedal assembly 200 and the brake pedal assembly 300 operate. Further, a signal of an acceleration sensor to be described below and a signal of a brake sensor to be described below may be separated, thereby preventing an error related to the generation of the signals when the pedal assemblies operate.

First elliptical holes 151 and first circular holes 152 are provided in the center housing no and the right housing 130 of the pedal housing 100. The accelerator pedal assembly 200 is assembled to the first elliptical holes 151 and the first circular holes 152.

The first elliptical hole 151 is positioned forward of the first circular hole 152 and positioned above the first circular hole 152. The first circular hole 152 is positioned rearward of the first elliptical hole 151 and positioned below the first elliptical hole 151.

Referring to FIG. 1, protrusion portions are formed on the right housing 130 and a right surface of the partition wall 111 of the center housing 110. The protrusion portions protrude toward each other and are spaced apart from each other in a forward/rearward direction.

The first elliptical holes 151 are formed to extend in the forward/rearward direction in the protrusion portions provided at the front side and disposed in the leftward/rightward direction among the protrusion portions. The first circular holes 152 are formed in the protrusion portions provided at the rear side and disposed in the leftward/rightward direction.

The accelerator pedal assembly 200 includes a first pedal pad 210 protruding to the outside of the cover 140 and configured to be operated by the driver, a first front rod 220 having one end rotatably and hingedly coupled to the first pedal pad 210 and the other end assembled to the first elliptical hole 151 so as to move along the first elliptical hole 151 when the first pedal pad 210 operates, and a first rear rod 230 having one end rotatably and hingedly coupled to the first pedal pad 210 and the other end rotatably and hingedly assembled to the first circular hole 152.

The first front rod 220 and the first rear rod 230 each have an arc shape having a predetermined curvature and are symmetrically installed in the forward/rearward direction.

The two opposite left and right ends of the lower end of the first front rod 220 are inserted and coupled into the first elliptical holes 151. The two opposite ends of the lower end of the first rear rod 230 are rotatably assembled to the first circular holes 152.

The accelerator pedal assembly 200 further includes a first return spring 240 configured to connect the first front rod 220 and the first rear rod 230. The first return spring 240 restores the accelerator pedal assembly 200 when the driver's operating force is released from the first pedal pad 210.

When the accelerator pedal assembly 200 is installed, a predetermined gap is formed between the first pedal pad 210 and a surface of the cover 140.

Therefore, the accelerator pedal assembly 200 further includes a first rubber damper 250 coupled to the first pedal pad 210 and installed to be in contact with the cover 140.

The first rubber damper 250 has a size sufficient to cover the cover hole 141 formed in the cover 140 and serves to prevent foreign substances from entering the pedal housing 100.

In addition, the first rubber damper 250 is compressed when the driver operates and pushes the first pedal pad 210, such that the first pedal pad 210 operates through a fine-displacement pressure operation. When the driver's operating force is released from the first pedal pad 210, the first rubber damper 250, together with the first return spring 240, provides a restoring force to the accelerator pedal assembly 200.

The first rubber damper 250 serves to assist the first return spring 240 in restoring the accelerator pedal assembly 200. Therefore, a spring force of the first return spring 240 is higher than an elastic force of the first rubber damper 250.

The electronic pedal apparatus according to embodiments of the present invention further includes an acceleration sensor 400 provided in the accelerator pedal assembly 200 and the pedal housing 100 and configured to generate signals related to vehicle acceleration when the accelerator pedal assembly 200 operates.

The acceleration sensor 400 includes a first front magnet 410 coupled to the lower end of the first front rod 220 and positioned in the first elliptical hole 151, a first rear magnet 420 coupled to the lower end of the first rear rod 230 and positioned in the first circular hole 152, a first main printed circuit board (PCB) 430 coupled to the pedal housing 100 so as to face the first front magnet 410, the first main PCB being configured to detect a change in magnetic flux of the first front magnet 410 and to generate a signal related to an acceleration function of the vehicle when the first pedal pad 210 operates, and a first sub-PCB 440 coupled to the pedal housing 100 so as to face the first rear magnet 420, the first sub-PCB 440 being configured to detect a change in magnetic flux of the first rear magnet 420 and to generate a signal related to the acceleration function of the vehicle when the first pedal pad 210 operates.

When the accelerator pedal assembly 200 operates, the signal generated by the first main PCB 430 is a main signal, and the signal of the first sub-PCB 440 is a redundancy signal.

That is, since the first front magnet 410 moves along the first elliptical hole 151 when the accelerator pedal assembly 200 operates, the first front magnet 410 has a larger operating displacement than the first rear magnet 420. As the operating displacement of the magnet increases, the change in magnetic flux increases, such that a more accurate signal may be generated. Therefore, the signal generated by the first main PCB 430, which makes a pair with the first front magnet 410, is treated as the main signal, and the signal of the first sub-PCB 440 is treated as the redundancy signal on the concept of a fail-safe function when the first main PCB 430 is broken down.

According to an embodiment of the present invention, when the driver operates and pushes the accelerator pedal assembly 200, the first rubber damper 250 is compressed, the first pedal pad 210 moves in a compression direction (arrow M1), as illustrated in FIG. 6, the lower end of the first front rod 220 moves forward and upward (arrow M2) along the first elliptical hole 151, and the first pedal pad 210 also moves forward and upward (arrow M3).

That is, when the driver operates the accelerator pedal assembly 200, the first pedal pad 210 performs a dual motion in the compression direction (arrow M1) and the upward direction (arrow M3). Since the first pedal pad 210 performs the dual motion, the driver may easily recognize the operation amount of the pedal pad even though the movement displacement of the pedal pad is small. Therefore, the recognition performance related to the operation of the accelerator pedal is improved, which greatly assists in preventing an erroneous operation.

In the case of the accelerator pedal assembly 200, the first pedal pad 210 is directed upward and operates while pushing the driver's leg, such that it is difficult for the driver to apply a large amount of force to operate the first pedal pad 210, which provides an advantageous effect of preventing the rapid acceleration and erroneous operation.

According to embodiments of the present invention, second circular holes 161 and second elliptical holes 162 are provided in the center housing no and the left housing 120 of the pedal housing 100. The brake pedal assembly 300 is assembled to the second circular holes 161 and the second elliptical holes 162.

The second circular hole 161 is positioned forward of the second elliptical hole 162 and positioned above the second elliptical hole 162. The second elliptical hole 162 is positioned rearward of the second circular hole 161 and positioned below the second circular hole 161.

Referring to FIG. 1, protrusion portions are formed on the left housing 120 and a left surface of the partition wall 111 of the center housing no. The protrusion portions protrude toward each other and are spaced apart from each other in the forward/rearward direction.

The second circular holes 161 are formed in the protrusion portions provided at the front side and are disposed in the leftward/rightward direction among the protrusion portions. The second elliptical holes 162 are formed to extend in the forward/rearward direction in the protrusion portions provided at the rear side and are disposed in the leftward/rightward direction.

The brake pedal assembly 300 includes a second pedal pad 310 protruding to the outside of the cover 140 and configured to be operated by the driver, a second front rod 320 having one end rotatably and hingedly coupled to the second pedal pad 310 and the other end rotatably and hingedly assembled to the second circular hole 161, and a second rear rod 330 having one end rotatably and hingedly coupled to the second pedal pad 310 and the other end assembled to the second elliptical hole 162 so as to move along the second elliptical hole 162 when the second pedal pad 310 operates.

The second front rod 320 and the second rear rod 330 each have an arc shape having a predetermined curvature and are systematically installed in the forward/rearward direction.

The two opposite left and right ends of the lower end of the second front rod 320 are rotatably assembled to the second circular holes 161. The two opposite ends of the lower end of the second rear rod 330 are inserted and coupled into the second elliptical holes 162.

The brake pedal assembly 300 further includes a second return spring 340 configured to connect the second front rod 320 and the second rear rod 330. The second return spring 340 restores the brake pedal assembly 300 when the driver's operating force is released from the second pedal pad 310.

When the brake pedal assembly 300 is installed, a predetermined gap is formed between the second pedal pad 310 and a surface of the cover 140.

Therefore, the brake pedal assembly 300 further includes a second rubber damper 350 coupled to the second pedal pad 310 and installed to be in contact with the cover 140.

The second rubber damper 350 has a size sufficient to cover the cover hole 142 formed in the cover 140 and serves to prevent foreign substances from entering the pedal housing 100.

In addition, the second rubber damper 350 is compressed when the driver operates and pushes the second pedal pad 310, such that the second pedal pad 310 operates through a fine-displacement pressure operation. When the driver's operating force is released from the second pedal pad 310, the second rubber damper 350, together with the second return spring 340, provides a restoring force to the brake pedal assembly 300.

The second rubber damper 350 serves to assist the second return spring 340 in restoring the brake pedal assembly 300. Therefore, a spring force of the second return spring 340 is higher than an elastic force of the second rubber damper 350.

The electronic pedal apparatus according to embodiments of the present invention further includes a brake sensor 500 provided in the brake pedal assembly 300 and the pedal housing 100 and configured to generate signals related to vehicle braking when the brake pedal assembly 300 operates.

The brake sensor 500 includes a second front magnet 510 coupled to the lower end of the second front rod 320 and positioned in the second circular hole 161, a second rear magnet 520 coupled to the lower end of the second rear rod 330 and positioned in the second elliptical hole 162, a second main PCB 530 coupled to the pedal housing 100 so as to face the second rear magnet 520, the second main PCB 530 being configured to detect a change in magnetic flux of the second rear magnet 520 and to generate a signal related to a braking function of the vehicle when the second pedal pad 310 operates, and a second sub-PCB 540 coupled to the pedal housing 100 so as to face the second front magnet 510, the second sub-PCB 540 being configured to detect a change in magnetic flux of the second front magnet 510 and to generate a signal related to the braking function of the vehicle when the second pedal pad 310 operates.

When the brake pedal assembly 300 operates, the signal generated by the second main PCB 530 is a main signal, and the signal of the second sub-PCB 540 is a redundancy signal.

That is, since the second rear magnet 520 moves along the second elliptical hole 162 when the brake pedal assembly 300 operates, the second rear magnet 520 has a larger operating displacement than the second front magnet 510. As the operating displacement of the magnet increases, the change in magnetic flux increases, such that a more accurate signal may be generated. Therefore, the signal generated by the second main PCB 530, which makes a pair with the second rear magnet 520, is treated as the main signal, and the signal of the second sub-PCB 540 is treated as the redundancy signal on the concept of a fail-safe function when the second main PCB 530 is broken down.

Figure 9:
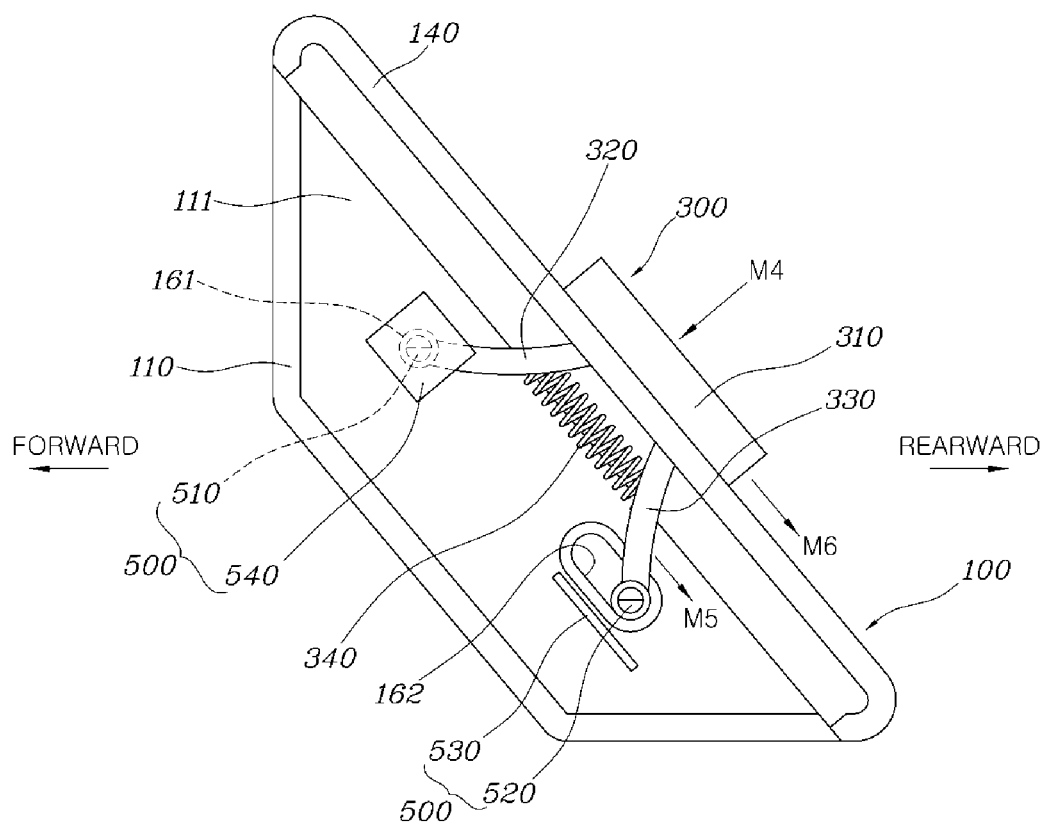
FIG. 9 is a view illustrating a state in which the driver operates the brake pedal assembly in FIG. 7.

According to an embodiment of the present invention, when the driver operates and pushes the brake pedal assembly 300, the second rubber damper 350 is compressed, the second pedal pad 310 moves in a compression direction (arrow M4), as illustrated in FIG. 9, the lower end of the second rear rod 330 moves rearward and downward (arrow M5) along the second elliptical hole 162, and the second pedal pad 310 also moves rearward and downward (arrow M6).

That is, when the driver operates the brake pedal assembly 300, the second pedal pad 310 performs a dual motion in the compression direction (arrow M4) and the downward direction (arrow M6). Since the second pedal pad 310 performs the dual motion, the driver may easily recognize the operation amount of the pedal pad even though the movement displacement of the pedal pad is small. Therefore, the recognition performance related to the operation of the brake pedal is improved, which greatly assists in preventing an erroneous operation.

In the case of the brake pedal assembly 300, the second pedal pad 310 is directed downward and operates while pulling the driver's leg, such that the driver may apply a large amount of force to operate the second pedal pad 310 and may easily operate the second pedal pad 310 with a large amount of force, which provides an advantageous effect of performing emergency braking in an emergency situation.

In the electronic pedal apparatus according to embodiments of the present invention, the accelerator pedal assembly 200 and the brake pedal assembly 300 are installed to be spaced apart from each other in the leftward/rightward direction in the pedal housing 100, and the first pedal pad 210 of the accelerator pedal assembly 200 and the second pedal pad 310 of the brake pedal assembly 300 are disposed in the pedal housing 100 so as to extend in a vertical direction and a horizontal direction, respectively. Therefore, it is possible to prevent the erroneous operation and further improve the safety related to the operation of the pedal.

In addition, the second pedal pad 310 of the brake pedal assembly 300 is larger in size than the first pedal pad 210 of the accelerator pedal assembly 200, such that the operation of the brake pedal may be more easily performed than the operation of the accelerator pedal. Therefore, it is possible to prevent the erroneous operation and improve the safety related to the operation of the pedal.

As described above, the electronic pedal apparatus according to embodiments of the present invention may be operated by the driver with a small effort. Further, the electronic pedal apparatus operates by fine displacement when the driver operates the electronic pedal apparatus, such that the driver may easily recognize an operating situation of the pedal. Further, the mechanical mechanism using the return spring and the rubber damper may assist the driver's operating force, thereby reducing the driver's fatigue while the driver operates the pedal.

In addition, according to embodiments of the present invention, the accelerator pedal apparatus and the brake pedal apparatus move along the different movement trajectories when the driver operates the accelerator pedal apparatus and the brake pedal apparatus. Further, the accelerator pedal apparatus and the brake pedal apparatus perform the dual motion. Therefore, it is possible to improve the recognition performance related to the operation of the pedal and prevent the erroneous operation.

While the specific embodiments of the present invention have been illustrated and described, it will be obvious to those skilled in the art that the present invention may be variously modified and changed without departing from the technical spirit of the present invention defined in the appended claims.

What is claimed is:

1. An electronic pedal apparatus comprising:
a pedal housing, comprising:
  a center housing having a space divided into left and right spaces by a partition wall;
  left and right housings coupled to left and right sides of the center housing; and
  a cover simultaneously covering the center housing, the left housing, and the right housing; and
an accelerator pedal assembly and a brake pedal assembly coupled to the pedal housing and configured to move along different movement trajectories when the accelerator pedal assembly and the brake pedal assembly are operated,
wherein:
  the accelerator pedal assembly penetrates the cover and is provided in spaces of the center housing and the right housing; and
  the brake pedal assembly penetrates the cover and is provided in spaces of the center housing and the left housing.

2. The electronic pedal apparatus of claim 1, wherein the accelerator pedal assembly is compressed and moved upward when the accelerator pedal assembly is operated, and the brake pedal assembly is compressed and moved downward when the brake pedal assembly is operated.

3. The electronic pedal apparatus of claim 1, wherein:
elliptical holes and circular holes are provided in each of the center housing and the right housing,
the accelerator pedal assembly is assembled to the elliptical holes and the circular holes, and
the elliptical holes are positioned above the circular holes.

4. The electronic pedal apparatus of claim 3, wherein the accelerator pedal assembly comprises:
a pedal pad protruding to an outside of the cover and operable by a driver;
a front rod having a first end rotatably coupled to the pedal pad and a second end assembled to the elliptical holes so as to move along the elliptical holes when the pedal pad operates; and
a rear rod having a first end rotatably coupled to the pedal pad and a second end rotatably assembled to the circular holes.

5. The electronic pedal apparatus of claim 4, wherein the accelerator pedal assembly further comprises a return spring configured to connect the front rod and the rear rod and to restore the accelerator pedal assembly when an operating force of the driver is released from the pedal pad.

6. The electronic pedal apparatus of claim 5, wherein:
the accelerator pedal assembly further comprises a rubber damper coupled to the pedal pad and in contact with the cover;
the rubber damper is configured to prevent foreign substances from entering the pedal housing; and
the rubber damper, together with the return spring, is configured to provide a restoring force to the accelerator pedal assembly when the operating force of the driver is released from the pedal pad.

7. The electronic pedal apparatus of claim 4, further comprising an acceleration sensor provided in the accelerator pedal assembly and the pedal housing and configured to generate a signal related to vehicle acceleration when the accelerator pedal assembly operates.

8. The electronic pedal apparatus of claim 7, wherein the acceleration sensor comprises:
   a front magnet coupled to a lower end of the front rod and positioned in the elliptical holes;
   a rear magnet coupled to a lower end of the rear rod and positioned in the circular holes;
   a main printed circuit board (PCB) coupled to the pedal housing and facing the front magnet, the main PCB being configured to detect a change in magnetic flux of the front magnet and to generate a signal related to an acceleration function of a vehicle when the pedal pad operates; and
   a sub-PCB coupled to the pedal housing and facing the rear magnet, the sub-PCB being configured to detect a change in magnetic flux of the rear magnet and to generate a signal related to the acceleration function of the vehicle when the pedal pad operates.

9. The electronic pedal apparatus of claim 8, wherein when the accelerator pedal assembly operates, a signal generated by the main PCB is a main signal, and a signal of the sub-PCB is a redundancy signal.

10. An electronic pedal apparatus comprising:
    a pedal housing, comprising:
       a center housing having a space divided into left and right spaces by a partition wall;
       left and right housings coupled to left and right sides of the center housing; and
       a cover simultaneously covering the center housing, the left housing, and the right housing; and
    an accelerator pedal assembly and a brake pedal assembly coupled to the pedal housing and configured to move along different movement trajectories when the accelerator pedal assembly and the brake pedal assembly are operated,
    wherein:
       the accelerator pedal assembly penetrates the cover and is provided in spaces of the center housing and the right housing; and
       the brake pedal assembly penetrates the cover and is provided in spaces of the center housing and the left housing; and
       the accelerator pedal assembly and the brake pedal assembly are installed in the pedal housing and spaced apart from each other in a leftward/rightward direction.

11. The electronic pedal apparatus of claim 10, wherein a first pedal pad of the accelerator pedal assembly operated by a driver and a second pedal pad of the brake pedal assembly operated by the driver are provided in the pedal housing so as to extend in a vertical direction and a horizontal direction, respectively.

12. An electronic pedal apparatus comprising:
    a pedal housing comprising:
       a center housing having a space divided into left and right spaces by a partition wall;
       left and right housings coupled to left and right sides of the center housing;
       circular holes and elliptical holes provided in each of the center housing and the left housing, the circular holes being positioned above the elliptical holes; and
       a cover simultaneously covering the center housing, the left housing, and the right housing; and
    an accelerator pedal assembly and a brake pedal assembly coupled to the pedal housing and configured to move along different movement trajectories when the accelerator pedal assembly and the brake pedal assembly are operated;
    wherein the accelerator pedal assembly penetrates the cover and is provided in spaces of the center housing and the right housing; and
    wherein the brake pedal assembly penetrates the cover, is provided in spaces of the center housing and the left housing, and is assembled to the circular holes and the elliptical holes.

13. The electronic pedal apparatus of claim 12, wherein the brake pedal assembly comprises:
    a pedal pad protruding to an outside of the cover and operable by a driver;
    a front rod having a first end rotatably coupled to the pedal pad and a second end rotatably assembled to the circular holes; and
    a rear rod having a first end rotatably coupled to the pedal pad and a second end assembled to the elliptical holes so as to move along the elliptical holes when the pedal pad operates.

14. The electronic pedal apparatus of claim 13, wherein the brake pedal assembly further comprises a return spring configured to connect the front rod and the rear rod and to restore the brake pedal assembly when an operating force of the driver is released from the pedal pad.

15. The electronic pedal apparatus of claim 14, wherein:
    the brake pedal assembly further comprises a rubber damper coupled to the pedal pad and in contact with the cover;
    the rubber damper is configured to prevent foreign substances from entering the pedal housing; and
    the rubber damper, together with the return spring, is configured to provide a restoring force to the brake pedal assembly when the operating force of the driver is released from the pedal pad.

16. The electronic pedal apparatus of claim 13, further comprising a brake sensor provided in the brake pedal assembly and the pedal housing and configured to generate a signal related to vehicle braking when the brake pedal assembly operates.

17. The electronic pedal apparatus of claim 16, wherein the brake sensor comprises:
    a front magnet coupled to a lower end of the front rod and positioned in the circular holes;
    a rear magnet coupled to a lower end of the rear rod and positioned in the elliptical holes;
    a main printed circuit board (PCB) coupled to the pedal housing and facing the rear magnet, the main PCB being configured to detect a change in magnetic flux of the rear magnet and to generate a signal related to a braking function of a vehicle when the pedal pad operates; and
    a sub-PCB coupled to the pedal housing and facing the front magnet, the sub-PCB being configured to detect a change in magnetic flux of the front magnet and to generate a signal related to the braking function of the vehicle when the pedal pad operates.

18. The electronic pedal apparatus of claim 17, wherein when the brake pedal assembly operates, a signal generated by the main PCB is a main signal, and a signal of the sub-PCB is a redundancy signal.

* * * * *